United States Patent
MacMullin et al.

(10) Patent No.: US 12,523,888 B2
(45) Date of Patent: Jan. 13, 2026

(54) EYEWEAR WITH PRESCRIPTION AND LASER PROTECTION

(71) Applicant: Kentek Corporation, Boscaven, NH (US)

(72) Inventors: Thomas MacMullin, Boscaven, NH (US); Bonnie Simmons, Boscaven, NH (US)

(73) Assignee: Kentek Corporation, Boscaven, NH (US)

( * ) Notice: Subject to any disclaimer, the term of this patent is extended or adjusted under 35 U.S.C. 154(b) by 405 days.

(21) Appl. No.: 18/160,751

(22) Filed: Jan. 27, 2023

(65) Prior Publication Data
US 2024/0255777 A1 Aug. 1, 2024

(51) Int. Cl.
*G02C 7/02* (2006.01)
*G02C 7/06* (2006.01)

(52) U.S. Cl.
CPC .............. *G02C 7/027* (2013.01); *G02C 7/025* (2013.01); *G02C 7/06* (2013.01)

(58) Field of Classification Search
CPC .......... G02C 7/027; G02C 7/025; G02C 7/06; G02C 2202/08; G02C 7/104; G02C 2202/16; B29D 11/00009; B29D 11/0073; B29D 11/00913
See application file for complete search history.

(56) References Cited

U.S. PATENT DOCUMENTS

| 4,878,748 | A | * | 11/1989 | Johansen | G02C 7/104 |
| | | | | | 351/44 |
| 6,157,490 | A | * | 12/2000 | Wheatley | G02B 5/287 |
| | | | | | 359/590 |
| 6,637,877 | B1 | * | 10/2003 | Hartley | G02C 7/02 |
| | | | | | 351/44 |
| 6,682,193 | B1 | * | 1/2004 | Morris | B29D 11/00009 |
| | | | | | 351/44 |
| 2003/0022105 | A1 | * | 1/2003 | Prasad | A61K 41/008 |
| | | | | | 430/945 |
| 2003/0214080 | A1 | * | 11/2003 | Maki | G02C 7/102 |
| | | | | | 351/159.74 |

(Continued)

FOREIGN PATENT DOCUMENTS

| EP | 2290412 | A1 | * | 3/2011 | ............. | A61F 9/022 |
| EP | 4174532 | A1 | * | 5/2023 | ............. | G02C 7/104 |

(Continued)

OTHER PUBLICATIONS

Yoho, Alex, "Size Matters", May 2018, 20/20 Magazine (Year: 2018).*

(Continued)

*Primary Examiner* — William Lu
(74) *Attorney, Agent, or Firm* — Workman Nydegger

(57) ABSTRACT

A lens blank includes a first layer and a second layer. The first layer has an anterior surface and a posterior surface and is formed of a base material and one or more energy absorptive dyes generally uniformly dispersed throughout the base material. The one or more dyes are configured to absorb electromagnetic energy. The second layer is bonded or permanently attached to the posterior surface of the first layer and is formed of a generally clear base material.

20 Claims, 3 Drawing Sheets

(56) References Cited

U.S. PATENT DOCUMENTS

| | | | |
|---|---|---|---|
| 2004/0025232 A1* | 2/2004 | Hartley | A61F 9/025 2/452 |
| 2004/0145700 A1* | 7/2004 | Miniutti | G02C 7/12 351/159.56 |
| 2004/0145701 A1* | 7/2004 | Miniutti | G02C 7/02 351/159.62 |
| 2007/0285615 A1 | 12/2007 | Yamamoto et al. | |
| 2008/0186565 A1* | 8/2008 | Krieg-Kowald | A61F 9/022 359/356 |
| 2009/0169870 A1* | 7/2009 | Zheng | C09D 5/00 264/1.7 |
| 2009/0268157 A1* | 10/2009 | Krieg-Kowald | G02B 5/223 351/159.63 |
| 2010/0110370 A1* | 5/2010 | Krieg-Kowald | A61F 9/022 252/582 |
| 2012/0008192 A1* | 1/2012 | You | G02B 5/208 359/359 |
| 2015/0316688 A1* | 11/2015 | Cefalo | G02B 1/14 252/586 |
| 2017/0075143 A1* | 3/2017 | Saylor | G02C 7/101 |
| 2017/0219849 A1* | 8/2017 | Perricone | A61F 9/02 |
| 2017/0261768 A1* | 9/2017 | Ambler | G02C 7/104 |
| 2018/0239171 A1* | 8/2018 | Wold | G02B 5/28 |
| 2020/0110288 A1 | 4/2020 | Chen et al. | |
| 2022/0410511 A1* | 12/2022 | Ambur | B29D 11/00009 |
| 2023/0066173 A1* | 3/2023 | Jamali | G02C 7/101 |
| 2023/0092193 A1* | 3/2023 | Sparks | C08K 3/32 524/413 |
| 2024/0252038 A1* | 8/2024 | MacMullin | A61B 3/10 |

FOREIGN PATENT DOCUMENTS

| | | | | |
|---|---|---|---|---|
| WO | WO-2006070830 A1 * | 7/2006 | | G02C 7/12 |
| WO | WO-2017058562 A1 * | 4/2017 | | A61F 9/022 |
| WO | WO-2021111291 A1 * | 6/2021 | | B29D 11/00009 |

OTHER PUBLICATIONS

International Search Report and Written Opinion received for PCT Patent Application No. PCT/US24/12953, mailed on Apr. 10, 2024, 11 pages.

* cited by examiner

EYEWEAR WITH PRESCRIPTION AND LASER PROTECTION

BACKGROUND

1. Technical Field

The present application relates to eyewear. More specifically, the present application relates to eyewear with one or more lenses that can be polished with a user's prescription and that can provide protection from lasers or light with certain characteristics.

2. The Relevant Technology

In the decades since their original development, the use of lasers has expanded into numerous and varied technical fields. For instance, lasers are commonly used in optical disc drives, printers, barcode scanners, DNA sequencing instruments, fiber optics, photolithography, medical treatments, cutting and melding applications, and many other fields and technologies. In many instances, the use of lasers requires adherence to certain safety protocols to protect those in proximity to the lasers.

One such safety protocol is the use of protective eyewear. Human eyes are highly vulnerable to laser radiation. Unprotected exposure to lasers can result in the development of cataracts, corneal burns, and vision loss. Protective eyewear can block the high-intensity radiation from the laser from reaching the eyes, thereby protecting the eyes from the harmful effects of the lasers.

Although various types of laser protective eyewear are readily available, there are multiple areas where improvement can be made. For instance, typical laser protective eyewear is not suitable for having a user's prescription polished therein. As a result, for a user that wears corrective/prescription lenses (e.g., eyeglasses), the user would have to wear two sets of eyewear—the normal eyeglasses and the laser protective eyewear—in order to see clearly and protect his/her eyes from the laser.

Some efforts have been made to provide prescription and laser protective eyewear. For instance, tinted mineral glass has been used to make lenses for such eyewear. While the mineral glass may be polished with a user's prescription, it presents other undesirable characteristics. For instance, when the prescription is polished into the glass, portions of the glass are thinned out more than other parts. This results in a gradation of colors across the glass (e.g., due to less tint in the thin or polished areas), which can be distracting to or impair the vision of the user and/or may negatively impact the safety characteristics of the eyewear. Furthermore, in order to be able to apply a range of different prescriptions, the mineral glass typically has to be relatively thick, which can lead to the undesirable Coke-bottle effect.

In light of the above, there remains room for improvement in the area of eyewear, particularly as it relates to prescription and laser protective eyewear.

BRIEF SUMMARY

The present application relates to eyewear. More specifically, the present application relates to eyewear with one or more lenses that can be polished with a user's prescription and that can provide protection from lasers or light with certain characteristics.

For instance, in one embodiment, a lens blank may include a first layer and a second layer. The first layer may have an anterior surface and a posterior surface and be formed of a base material and one or more energy absorptive dyes generally uniformly dispersed throughout the base material. The one or more dyes may be configured to absorb electromagnetic energy. The second layer may be bonded or permanently attached to the posterior surface of the first layer and may be formed of a generally clear base material. The second layer may be thick enough and configured to have a corrective prescription surfaced or polished into the posterior surface thereof without affecting the first layer. The lens blank may have an optical density equal to or greater than 2.

In another embodiment, a lens is configured to provide vision correction and laser protection. The lens includes a first layer and a second layer. The first layer has an anterior surface and a posterior surface and a generally uniform thickness therebetween. The first layer is formed of a base material and one or more energy absorptive dyes generally uniformly dispersed throughout the base material. The one or more dyes are configured to absorb electromagnetic energy and produce a generally uniform color across the first layer. The second layer is bonded or permanently attached to the posterior surface of the first layer. The second layer is formed of a generally clear base material and has a posterior surface with a corrective prescription surfaced or polished therein. The lens has an optical density equal to or greater than 2.

In still yet another example embodiment, a method for forming a prescription and laser protective lens is provided. The method includes mixing one or more energy absorbing dyes into a base material to produce a generally homogeneous mixture of the base material and dye(s). The method also includes forming a first layer of a lens blank with the mixture of the base material and the dye(s), the first layer having an anterior surface and a posterior surface. The method also includes forming a second layer on the posterior surface of the first layer, the second layer being formed of a base material and having a posterior surface opposite to the first layer. The method also includes surfacing or polishing the posterior surface of the second layer with a corrective prescription.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The present application relates to eyewear. More specifically, the present application relates to eyewear with one or more lenses that can be polished with a user's prescription and that can provide protection from lasers or light with certain characteristics. Even more specifically, the present application relates to polymer-based lenses that can be used in eyewear to provide both prescription and laser protection characteristics.

Figure 1:
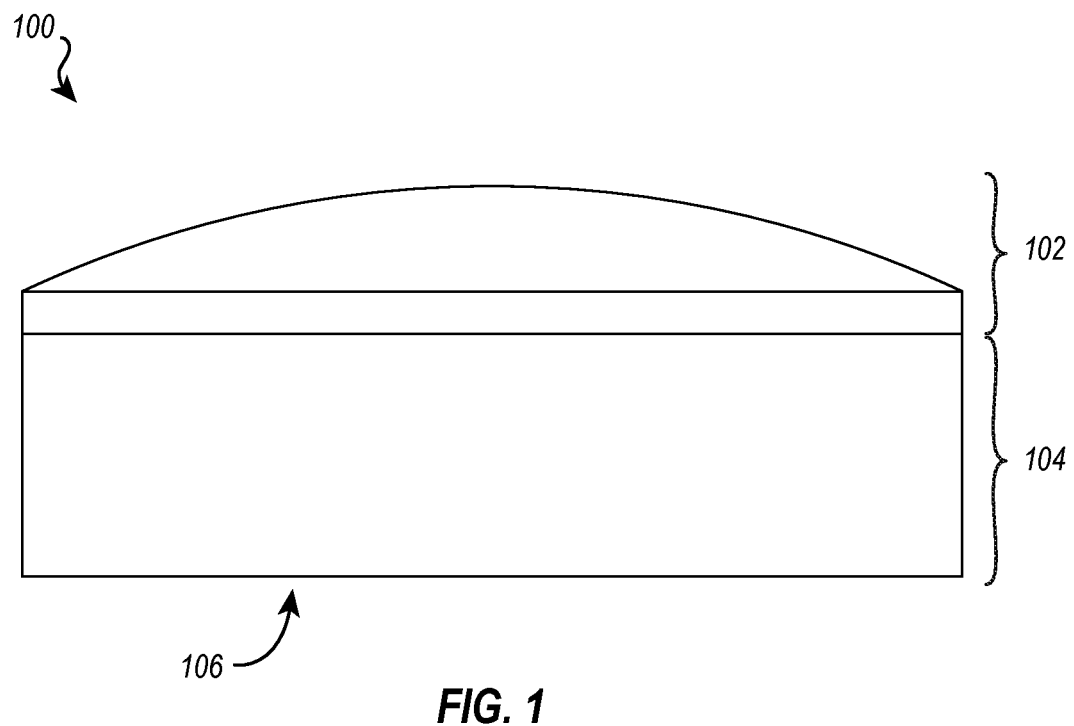
FIG. 1 illustrates a side view a lens blank according to an example embodiment of the present disclosure.
Figure 2:
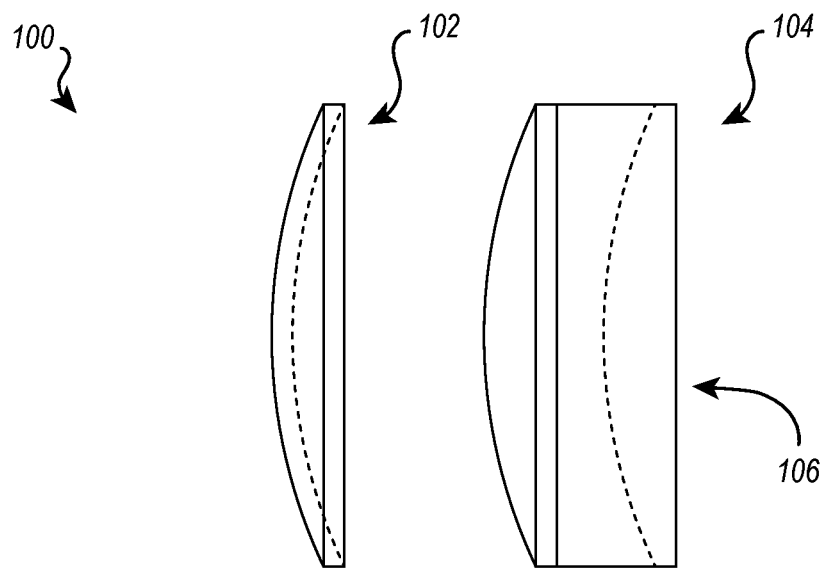
FIG. 2 illustrates an exploded view of the lens blank of FIG. 1.
Figure 3:
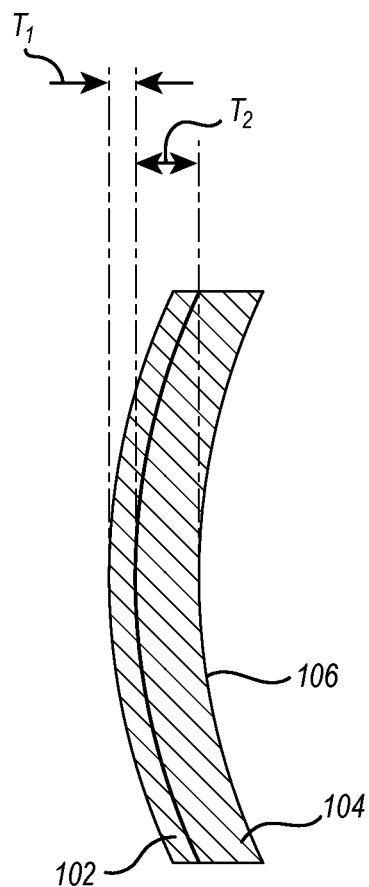
FIG. 3 illustrates a cross-sectional view of the lens blank of FIG. 1.

Attention is now directed to the Figures, which illustrate example embodiments of lenses that may provide the benefits and functionality discussed herein. For instance, FIGS. 1-3 illustrate side, exploded, and cross-sectional views of a lens blank 100 that may be used to create a prescription lens that have laser protection capabilities. In the illustrated embodiment, the lens blank 100 includes two layers. The first layer 102 is an anterior layer (e.g., that will be positioned further from (compared to the second layer) or face away the user's eye) and the second layer 104 is a posterior layer (e.g., that will be positioned closer to (compared to the first layer) or face towards a user's eye).

The first layer 102 may provide the laser protective features to a lens formed from the lens blank 100. The first layer 102 may be formed from a base resin, thermoplastic, or polymer. The base material may have one or more energy or laser absorptive dyes and/or other additives compounded thereto or mixed therein. The one or more other additives may include UV stabilizers. As will be discussed in greater detail below, the energy or laser absorptive dyes and/or other additives may provide the lens blank 100 with one or more characteristics that provide protection to a human eye. Suitable energy or laser absorptive dyes and/or other additives may be obtained from various suppliers, including Exciton, Epolin, QCR Solutions, HW Sands, Luxottica, and Moleculum. The amounts of the energy or laser absorptive dyes and/or other additives added to the first layer 102 may vary depending on the amount or type of protection sought.

The first layer 102 may have thickness $T_1$. In some embodiments, the thickness $T_1$ is generally uniform across the first layer 102. In some embodiments, the thickness $T_1$ of the first layer 102 may be within a range of between about 1.5 mm to 2.0 mm. For instance, in some embodiments, the thickness $T_1$ may be 1.6 mm. The thickness $T_1$ may have a tolerance of ±0.075 mm. The first layer 102 may also have a front radius of about 88.33 mm and a back radius of about 86.233 mm for a base curve of 6, a front radius of about 132.5 and a back radius of about 130.4 for a base curve of 4, or other values for other base curves, or values therebetween or within a reasonable variation therefrom (e.g., 1%, 5%, 10%, 25%, etc.).

As a result of the generally uniform thickness of the first layer 102, the dyes disposed within the first layer 102 may provide a generally uniform color across the first layer 102 (and across the lens blank 100). The uniform color may improve the visibility through a lens formed from the lens blank 100 compared to lenses formed from tinted glass that has a non-uniform thickness. The uniform thickness can also help ensure generally uniform protective characteristics across the first layer 102 (and thus across a lens formed from the lens blank 100).

The second layer 104 may be formed from various clear base materials (e.g., resins, thermoplastics, polymers) with different indexes of refraction. Such materials include polycarbonate, Roc Poly, and the like. In some embodiments, the base material for the second layer 104 may be the same as the base material for the first layer 102, albeit without the addition of the energy or laser absorptive dyes and/or other additives. As a result, the second layer 104 may be clear.

The second layer 104 may have a thickness $T_2$. In some embodiments, the thickness $T_2$ is generally uniform across the second layer 104. In some embodiments, the thickness $T_2$ of the second layer 104 may be within a range of between about 6 mm to 10 mm. For instance, in some embodiments, the thickness $T_2$ may be about 8.4 mm. The thickness $T_2$ may have a tolerance of ±0.075 mm. This thickness $T_2$ may be sufficient to allow the back side 106 of the second layer 104 to be polished or otherwise finished with a user's prescription, including with single vision or progressive prescriptions and with prescriptions ranging from −8 to 11+.

The second layer 104 may also have a front radius of about 88.33 mm and a back radius of about 86.233 mm for a base curve of 6, a front radius of about 132.5 and a back radius of about 130.4 for a base curve of 4, or other values for other base curves, or values therebetween or within a reasonable variation therefrom (e.g., 1%, 5%, 10%, 25%, etc.).

Figure 4:
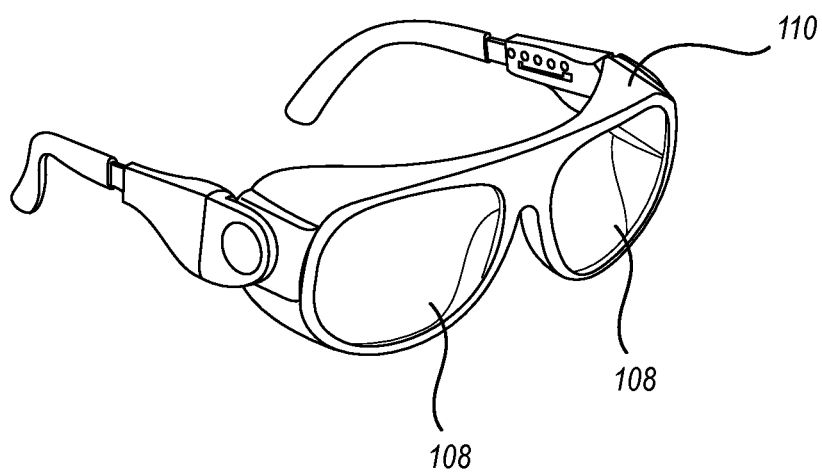
FIG. 4 illustrates an example embodiment of eyewear with lenses formed from lens blanks like those of FIGS. 1-3.

Once the lens blank 100 has been surfaced to add the user's prescription, the resulting lens 108 can be mounted within a frame 110, as shown in FIG. 4, that can be worn by a user. The resulting eyewear can thus provide the laser protection to the user's eyes while also having the user's prescription polished into the lenses 108.

Figure 5:
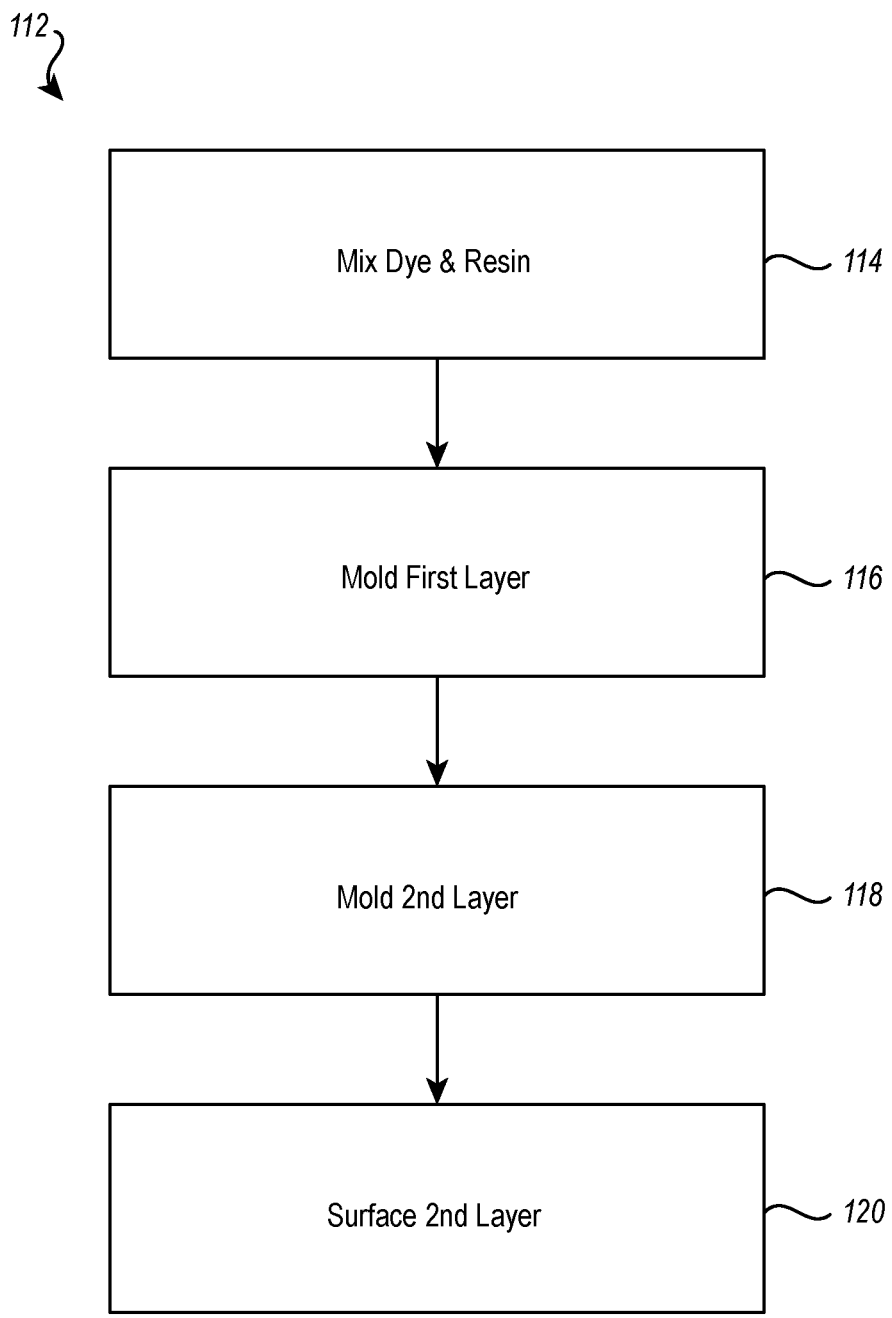
FIG. 5 illustrates an example method of making lenses with prescription and laser protective properties.

A method 112 for making the lens blank 100 and a lens 108 therefrom may include the steps illustrated in FIG. 5. According to the method 112, energy or laser absorptive dye(s) and/or other additives are mixed with a base material (resin, thermoplastic, polymer, etc.) in a step 114. This step may include mixing the components to provide a generally uniform distribution of the dye(s) and/or other additives throughout the base material.

The method may also include a two-shot injection molding process or other process to form the lens blank 100. For instance, the method 112 may include a first (injection molding) step 116 in which the mixture of base material and dye(s) and/or other additives is disposed or injected into a mold to form the first layer 102. The method 112 may also include a second (injection molding) step 118 in which a clear base material is disposed or injected into a mold (either the same mold, or a different mold if the first layer 102 has been moved the different mold) and onto the first layer 102 to form the second layer 104. The (injection molding) process may create a strong and generally uniform bond between the first and second layers 102, 104. In some embodiments, the (two-shot injection molding) process can bond or join the first and second layers 102, 104 together such that the first and second layers 102, 104 are integrally joined into a single component. With the (two-shot injection molding) process complete, the lens blank 100 is formed.

The method 112 may also include a step 120 in which the back side 106 of the second layer 104 is surfaced or polished to form the lens 108 with a desired prescription. The resulting lens(es) 108 may then be mounted within a frame to be worn by a user.

Notably, when the back side 106 of the second layer 104 is surfaced or polished to produce the desired prescription, the first layer 102 is not surfaced or polished. Accordingly, the thickness $T_1$ of the first layer 102 is not changed by the surfacing or polishing. As a result, the uniformity of the color across the first layer 102 remains unchanged, avoiding the color gradients common in exiting products. Likewise, the protective properties of the first layer 102 (provided by the dye(s) and/or other additives) are not altered by the surfacing or polishing of the back side 106 of the second layer 104.

As noted above, the energy or laser absorptive dye(s) and/or other additives that are included in the first layer 102 may provide the lens blank 100 or lens 108 with various desired protective properties. The various protective properties, or any combinations thereof, may be selected based on the intended use of the lens 108 and may be achieved through the selection of the particular dye(s) and/or other additives and/or the amount of the dye(s) and/or other additives that are added to the first layer 102.

By way of example, particular dye(s) and/or other additives and/or their respective amounts may be added to the first layer 102 to provide the resulting lens with light filtering capabilities within desired electromagnetic wavelength ranges, such as 100-400 nm, 190-11,000 nm, 5,500-11,000 nm, 900-1,070 nm, 900-1,080 nm, 190-532 nm, 754-780 nm, 800-1080 nm, 190-400 nm, 780-875 nm, 875-1,080 nm, 190-532 nm, 1,040-1,070 nm, 1,045-1,064 nm, 190-380 nm, 800-830 nm, 190-532 nm, 754-780 nm, 5,000-11,000 nm, or any ranges or values within or around the noted ranges. Likewise, particular dye(s) and/or other additives and/or their respective amounts may be added to the first layer 102 to provide the resulting lens with light filtering capabilities at specific wavelengths, such as 1,064 nm, 532 nm, 530 nm.

Particular dye(s) and/or other additives and/or their respective amounts may be selected to provide the resulting lens with desired visual light transmission values often measured in percentage, such as 19, 20, 42, 45, 50, 60, or values therebetween or therearound.

Still further, particular dye(s) and/or other additives and/or their respective amounts may be selected to provide the resulting lens with desired optical density values equal to or greater than 2, 3, 4, 5, 6, 7, 8, 9, 10, and in some cases above 10.

The combination of the thickness $T_1$ of the first layer 102 and the particular dye(s) and/or other additives and/or their respective amounts may provide the resulting lens with desired damage threshold levels. More specifically, the thickness $T_1$ of the first layer 102 may allow for sufficient energy or laser absorptive dye(s) to be added thereto to absorb the energy from the laser. Further, the thickness of the first layer (and optionally the thickness of the second layer) may be sufficient to allow for the dissipation of the heat resulting from the absorption of the laser energy without resulting in damage being done to the lens. In some embodiments, the combination of the dye(s) and the thickness of the layer(s) may provide the lens with a damage threshold of about 100 watts/centimeter$^2$. Similarly, the dye(s) and thickness of the first layer may provide the desired level of protection through a desired angle of indigence, such as from 0-30 degrees.

In accordance with the disclosure herein, one example embodiment of a lens blank having a first layer having an anterior surface and a posterior surface and being formed of a base material and one or more energy absorptive dyes generally uniformly dispersed throughout the base material. The one or more dyes being configured to absorb electromagnetic energy. The lens blank may also include a second layer bonded or permanently attached to the posterior surface of the first layer. The second layer may be formed of a generally clear base material and have a posterior surface opposite to the first layer. The posterior surface of the second layer may be configured to be surfaced or polished with a corrective prescription without effecting the first layer. The lens blank may have an optical density equal to or greater than 2.

In some embodiments, the one or more energy absorbing dyes produce a generally uniform color across the first layer.

In some embodiments, the first layer further comprises one or more UV stabilizers generally uniformly dispersed throughout the base material of the first layer.

In some embodiments, the base material of the second layer is the same type of material as the base material of the first layer.

In some embodiments, the base materials comprise a resin, thermoplastic, or polymer.

In some embodiments, the first layer has a generally uniform thickness.

In some embodiments, the thickness of the first layer is between about 1.5 mm and about 2.0 mm.

In some embodiments, the thickness of the first layer is about 1.6 mm.

In some embodiments, the second layer has a generally uniform thickness.

In some embodiments, the thickness of the second layer is between about 6 mm and 10 nm.

In some embodiments, the second layer has a thickness sufficient to have a full progressive prescription surfaced or polished into the posterior surface thereof without effecting the first layer.

In another example embodiment, a lens configured to provide vision correction and laser protection is provided. The lens may include a first layer having an anterior surface and a posterior surface and a generally uniform thickness therebetween. The first layer may be formed of a base material and one or more energy absorptive dyes generally uniformly dispersed throughout the base material. The one or more dyes may be configured to absorb electromagnetic energy and produce a generally uniform color across the first layer. The lens may also include a second layer bonded or permanently attached to the posterior surface of the first layer, the second layer being formed of a generally clear base material and having a posterior surface with a corrective prescription surfaced or polished therein. The lens may have an optical density equal to or greater than 2.

In some embodiments, the thickness of the first layer is between about 1.5 mm and about 2.0 mm.

In some embodiments, the corrective prescription is a full progressive prescription.

In some embodiments, the second layer has a non-polished or non-surfaced thickness of between about 6 mm and about 10 mm.

In some embodiments, the lens has a base curve of 2, 4, 6, or 8.

In yet another example embodiment, a method for forming a prescription and laser protective lens is provided. The method may include mixing one or more energy absorbing dyes into a base material to produce a generally homogeneous mixture of the base material and dye(s). The method may also include forming a first layer of a lens blank with the mixture of the base material and the dye(s), the first layer having an anterior surface and a posterior surface and providing the lens with an optical density equal to or greater than 2. The method may also include forming a second layer on the posterior surface of the first layer, the second layer being formed of a base material, the second layer having a posterior surface opposite to the first layer. The method may also include surfacing or polishing the posterior surface of the second layer with a corrective prescription.

In some embodiments, forming the first layer comprises inserting the mixture of the base material and dye(s) into a mold.

In some embodiments, forming the second layer comprises inserting the base material of the second layer into the mold and on the posterior surface of the first layer.

In some embodiments, the method also includes selecting the one or more dyes and amounts thereof to provide the lens with desired protective properties.

The terms "approximately," "about," "near," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A lens blank, comprising:
   a first layer having an anterior surface and a posterior surface and being formed of a base material and one or more energy absorptive dyes generally uniformly dispersed throughout the base material, the one or more dyes being configured to absorb electromagnetic energy; and
   a second layer bonded or permanently attached to the posterior surface of the first layer, the second layer being formed of a generally clear base material that is the same as the base material of the first layer to facilitate bonding or attachment between the first and second layers, the second layer having a posterior surface opposite to the first layer, the second layer having a thickness sufficient that the posterior surface of the second layer is configured to be surfaced or polished with a corrective prescription without effecting the first layer,
   wherein the first layer has a thickness and/or dye dispersion sufficient to maintain a generally uniform optical density of at least 2 and a generally uniform color after surfacing or polishing of a corrective prescription into the posterior surface of the second layer.

2. The lens blank of claim 1, wherein the one or more energy absorbing dyes produce the generally uniform color across the first layer.

3. The lens blank of claim 1, wherein the first layer further comprises one or more UV stabilizers generally uniformly dispersed throughout the base material of the first layer.

4. The lens blank of claim 1, wherein the one or more energy absorptive dyes provide the lens with light filtering capabilities between 100-400 nm, 190-11,000 nm, 5,500-11,000 nm, 900-1,070 nm, 900-1,080 nm, 190-532 nm, 754-780 nm, 800-1080 nm, 190-400 nm, 780-875 nm, 875-1,080 nm, 190-532 nm, 1,040-1,070 nm, 1,045-1,064 nm, 190-380 nm, 800-830 nm, 190-532 nm, 754-780 nm, or 5,000-11,000 nm.

5. The lens blank of claim 1, wherein the base materials comprise a resin, thermoplastic, or polymer.

6. The lens blank of claim 1, wherein the first layer has a generally uniform thickness.

7. The lens blank of claim 6, wherein the thickness of the first layer is between about 1.5 mm and about 2.0 mm.

8. The lens blank of claim 6, wherein the thickness of the first layer is about 1.6 mm.

9. The lens blank of claim 1, wherein the second layer has a generally uniform thickness.

10. The lens blank of claim 9, wherein the thickness of the second layer is between about 6 mm and 10 nm.

11. The lens blank of claim 1, wherein the one or more energy absorptive dyes provide the lens with light filtering capabilities at 1,064 nm, 532 nm, or 530 nm.

12. A lens configured to provide vision correction and laser protection, the lens comprising:
    a first layer having an anterior surface and a posterior surface and a generally uniform thickness therebetween, the first layer being formed of a base material and one or more energy absorptive dyes generally uniformly dispersed throughout the base material, the one or more dyes being configured to absorb electromagnetic energy, one or more energy absorbing dyes producing a generally uniform color across the first layer; and
    a second layer bonded or permanently attached to the posterior surface of the first layer, the second layer being formed of a generally clear base material that is the same as the base material of the first layer to facilitate bonding or attachment between the first and second layers, the second layer having a posterior surface with a corrective prescription surfaced or polished therein, the second layer having a thickness sufficient to contain a full progressive corrective prescription without reducing the thickness or altering the generally uniform color of the first layer,
    the lens having an generally uniform optical density equal to or greater than 2 across the lens.

13. The lens of claim 12, wherein the thickness of the first layer is between about 1.5 mm and about 2.0 mm.

14. The lens of claim 12, wherein the corrective prescription is a full progressive prescription.

15. The lens of claim 12, wherein the second layer has a non-polished or non-surfaced thickness of between about 6 mm and about 10 mm.

16. The lens of claim 12, wherein the lens has a base curve of 2, 4, 6, or 8.

17. A method for forming a prescription and laser protective lens, the method comprising:
    mixing one or more energy absorbing dyes into a base material to produce a generally homogeneous mixture of the base material and one or more energy absorbing dye(s);
    forming a first layer of a lens blank with the mixture of the base material and the one or more energy absorbing dye(s), the first layer having an anterior surface and a posterior surface and providing the lens with an optical density equal to or greater than 2 and a generally uniform color;
    forming a second layer on the posterior surface of the first layer, the second layer being formed of a base material that is the same as the base material of the first layer to facilitate bonding or attachment between the first and second layers, the second layer having a posterior surface opposite to the first layer, the second layer having a thickness sufficient to contain a full progressive corrective prescription without reducing the thickness or altering the generally uniform color of the first layer; and surfacing or polishing the posterior surface of the second layer with a corrective prescription, wherein surfacing or polishing does not reduce the thickness, change the optical density, alter the generally uniform color of the first layer.

18. The method of claim 17, wherein forming the first layer comprises inserting the mixture of the base material and dye(s) into a mold.

19. The method of claim 18, wherein forming the second layer comprises inserting the base material of the second layer into the mold and on the posterior surface of the first layer.

20. The method of claim 17, further comprising selecting the one or more dyes and amounts thereof to provide the lens with desired protective properties.

* * * * *